June 3, 1952     W. F. BRAUER     2,599,160
FISHING ROD SUPPORT
Filed Sept. 14, 1950
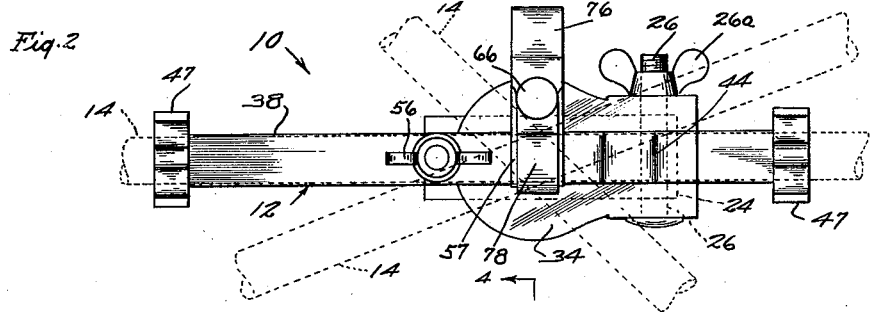
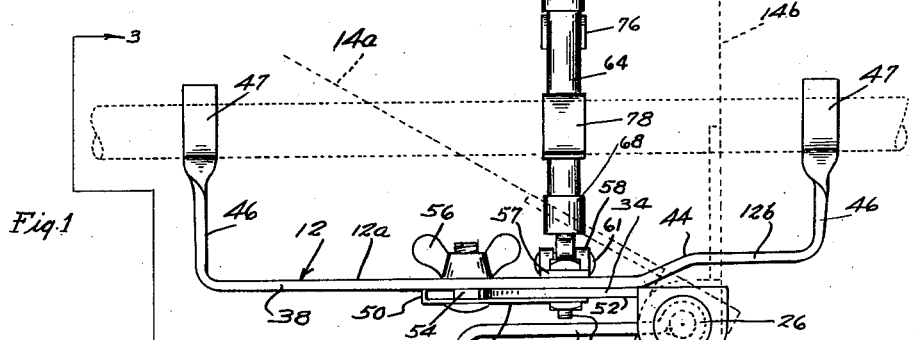
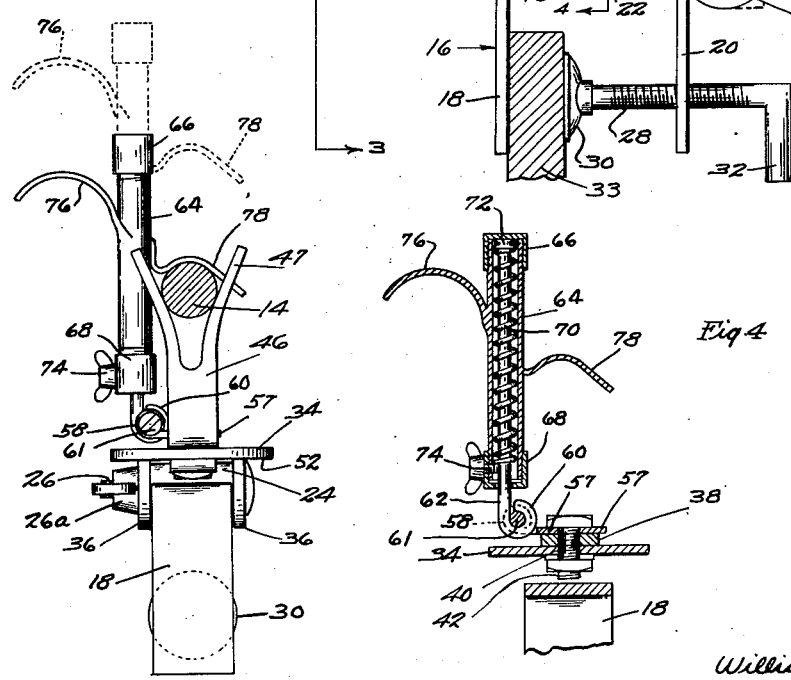
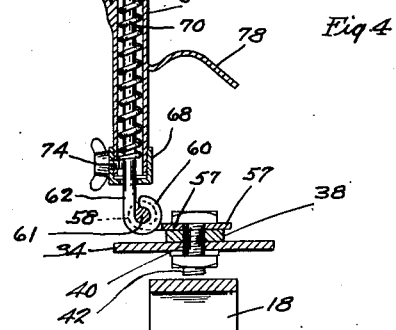
INVENTOR.
William F. Brauer
BY
HIS ATTY

Patented June 3, 1952

2,599,160

UNITED STATES PATENT OFFICE 2,599,160

FISHING ROD SUPPORT

William F. Brauer, Pasadena, Calif.

Application September 14, 1950, Serial No. 184,790

2 Claims. (Cl. 248—42)

The device of this invention relates in general to sport fishing gear, and more particularly to mechanical means to hold and steady a rod and line while trolling from a boat under way during such periods of time during which it is not necessary to exercise direct physical control over such rod and line.

Accordingly it is a prime object of the invention to provide a new and improved mechanical device adapted to be detachably clamped to appertenances of a boat, barge or pier to hold and support a fishing rod and line in functional use position.

An advantage of the invention resides in the provision of means to quickly attach and detach a rod to or from the support device to meet conditions exigent to a strike within permissible time limits therefor.

A further advantage of the invention resides in the provision of means to vary the horizontal angle in which a rod may be supported in accommodation of existing conditions, such for example, as space limitations due to the presence of other persons also engaged in fishing.

Another advantage of the improvement resides in the provision of means enabling the rod support to be swung through a vertical angle extending from the horizontal through 90 degrees in accommodation of space limitations as aforementioned for fishing from such angular position.

Still another advantage of the improvement resides in the fact that by mechanically supporting a rod in vertical position clearance is afforded an adjacent person in landing a fighting fish thereby avoiding entanglement of lines and much confusion.

A still further advantage of the provision of means for vertical support of a rod resides in the fact that it is possible to bait a hook or otherwise re-service a line with a minimum of effort and in a manner which causes the least inconvenience to the fisherman or his companions, especially when fishing from a crowded boat, barge or pier.

A further object of the improvement is to provide a rod support which is of simple and sturdy construction, which is easily worked, and which is of low cost for the purposes outlined.

Other objects, features and advantages of the invention may be noted from a study of the accompanying drawing, the detailed description and the sub-joined claims.

In the drawing:

Figure 1 is a side-elevational view of the rod support of this invention showing the device in horizontal position and indicating by dotted lines an intermediate and maximum vertical inclination thereof; and, Figure 2 is a top-plan view of the device shown in Figure 1, this view also shows angular positions of adjustment in a horizontal plane, Figure 3 is a front-elevational view of the support as seen along line 3—3, Figure 1.

Figure 4 is a sectional elevational view taken along line 4—4, Figure 1 showing construction of the spring resistant releasing clamp adapted to detachably secure a rod upon the support.

The rod support 10 of this invention comprises a body portion 12 upon which a rod 14 is detachably secured, and a clamp 16 upon which the body 12 is hingedly positioned.

The clamp 16 which is adapted to be secured upon the side of a boat or other comparable fixture, is formed of strip iron which is bent in the general shape of an inverted U having vertically disposed legs 18 and 20 and a horizontally disposed portion 22 intermediate of the legs substantially as shown, and which includes an eyelet 24 of circular section and which extends laterally of the place of intersection of one end of the part 22 and the leg 20, which eyelet is adapted to receive a bolt 26 by which the body portion 12 is hingedly secured upon the clamp portion 16. A screw 28 having a pressure plate 30 and a hand grip 32 for manipulation is adapted to bite the structure 33 for holding purposes.

A plate 34 upon which the body portion 12 is swingably positioned is formed with a pair of parallel and dependent lugs 36 which are apertured to receive the bolt 26 for fulcruming the plate upon the body of the clamp.

The body 12 is formed of a length of strip metal 38 having a horizontal portion 12a adapted to lie in face contact with the upper surface of the plate 34 and which is apertured at 40 to receive a bolt 42 extending therethrough and through the plate 34 so that these elements of the construction are pivotally united for swinging movement in a horizontal plane. The body 12 is also formed with the horizontal portion 12b which is off-set at 44 with respect to the portion 12a so as to provide clearance of the clamp screw 32 when the support is swung to uppermost position. The ends of the strip or bar 38 have upturned shanks 46 which are bifurcated to provide rests 47 for horizontally positioning the rod 14 substantially as shown in the drawing.

A bracket 48 having a flanged end 50 is secured at its one end by the bolt 42 upon the underface 52 of the plate 34, while a bolt 54 extending through an aperture in the bracket and through the related or adjacent portion 12a of the bar 38 is adapted to be tightened by a wing-nut 56 to cause the bracket and bar 38 to clamp the plate 34 for holding the bar against axial rotation, or for loosening thereof for swinging movement around the axis of the bolt 42 so that such angular adjustment thereof may be made as is desired.

A second bracket 57 is secured at its one end by the bolt 42 upon the top surface of the portion 12a of the bar 38 and is formed at its other end with bifurcated loops 58 so constructed and arranged as to receive the eye 60 of guide rod 62 therebetween for hinged movement upon a pin 61 extending therethrough. The plunger 62 is positioned in a cylinder 64 which serves as a housing therefor. A spring 70 encircling the guide rod has one end in abutment with a boss 72 upon the upper or free end of the guide rod and has its other end bearing upon the shank of a bolt 74 which is screw threaded through an apertured cap 68 upon the lower end of the cylindrical housing and the wall of such housing. A full closure cap 66 is secured upon the upper end of the tubular housing 64. The screw 74 is adapted upon being tightened to bear upon the plunger to fixedly secure the guide rod and housing 64 against relative movement.

A hand grip 76 secured upon the housing provides means for raising the housing and an arcuate finger 78 thereon against compressive resistance by the spring 70 so that clearance is afforded for placing the rod 14 in the bifurcated rests 42 for repose thereof.

The rod support is placed in use by being securely screw clamped to a conveniently located element 33 of a boat, barge or pier, and upon being so clamped in a use position, is adapted to use by grasping the finger 76 and lifting the cylinder 64 and the rod engaging finger 78 against the compressive resistance of the spring 70 to provide clearance between the finger 78 and the bifurcated rests 47 for placing the rod 14 in said rests. If a long run is to be made to the fishing grounds, or if for other reason one desires to leave his rod inactive and be certain it will not be accidentally dislodged from the support, it is only necessary to tighten the screw 70 thereby holding the guide rod 62 and the cylinder 64 against relative lineal movement to ensure that the finger 78 will not release its pressure grip upon the rod. Loosening the screw 74 enables free relative movement between the guide rod and the cylinder-finger 78 so that the rod is quickly removable from the support by merely lifting the cylinder-finger 78 from pressurized placement upon the rod.

With a rod in cradled position as shown in the several figures of the drawing, the support 12 and the rod 14 therein may be swung through any horizontal angle by loosening the nut 56 upon the bolt 54 to relieve clamping pressure of the bracket 48 and the bar 38 upon the plate 34. This facility is an advantage in accommodating one's fishing position to the crowded conditions which frequently prevail upon public fishing facilities.

If it is desired to fish with an erect rod, or if it is helpful or convenient to another that all near-by lines be hauled in for landing a fish, or if one need to bait his hook or otherwise service his tackle, the support and a rod cradled therein may be easily and quickly moved from a normal horizontal position to any elevated position of which positions 14a and 14b are indicative, by loosening the nut 26a to relieve the clamping pressure of the lugs 36 upon the ends of the looped metal strap forming the eye 24 of the clamp 16, and may be secured in the desired position of elevation by tightening the nut aforementioned.

It is believed that from the foregoing description it will be apparent that I have conceived and developed a practicable and operatively versatile fishing rod support, a device which relieves a person of tension and resulting fatigue between those periods of activity represented by a strike, a device which is sturdy and strong enough to meet all operational requirements, and finally a device which because of its inherent structural simplicity can be made at a low cost and hence be available to all those who follow sport fishing.

Having thus described my invention in its presently preferred form but without limitation thereto, that which I believe to be novel and for which I seek Letters Patent is as follows:

I claim:

1. A support device for fishing rods, said support device including a screw actuated clamp having a bearing thereon, a base plate fulcrumed upon said bearing for tilting movement thereof, a bar pivotally connected to said base plate, a bracket connected to the pivot of said bar and plate adapted to non-rotatably clamp said bar with respect to said plate, a second bracket, said second bracket being connected to the pivot of said bar and plate and extending laterally therefrom, a guide-rod hingedly connected to said last mentioned bracket, a tubular housing substantially encasing said guide-rod and having oppositely disposed fingers fixedly secured thereon, a spring in said tubular housing cooperable with said guide-rod and adapted to resist a lifting pressure applied to one of said tubular housing fingers, and means on said bar adapted to cradle a fishing rod therein, the other of said tubular housing fingers being adapted to resiliently bear upon said fishing rod intermediately of said cradle means upon release of the first mentioned tubular housing fingers.

2. A support device for fishing rods, said support device including a screw actuated clamp having a pintle bearing thereon, a base plate fulcrumed upon said pintle bearing for tilting movement thereof, a bar pivotally connected to said base plate, a bracket connected to the pivot of said bar and plate adapted to non-rotatably clamp said bar with respect to said plate, a second bracket, said second bracket being connected to the pivot of said bar and plate and extending laterally therefrom, a guide-rod hingedly connected to said bracket, a tubular housing substantially enclosing said guide-rod and adapted to relative lineal movement with respect thereto, a spring cooperable with said guide rod and being resistant of lineal movement of said tubular housing, means to manually lift said tubular housing against said spring, means on said tubular housing depressingly engaging said fishing rod, and a cradle integral with said bar cooperable with said last mentioned means adapted to secure said fishing rod in said support device.

WILLIAM F. BRAUER.

REFERENCES CITED

The following references are of record in the file of this patent:

UNITED STATES PATENTS

| Number | Name | Date |
|---|---|---|
| 710,780 | Hutchens | Oct. 7, 1902 |
| 2,430,112 | Hamre | Nov. 4, 1947 |
| 2,522,255 | Clino | Sept. 12, 1950 |

FOREIGN PATENTS

| Number | Country | Date |
|---|---|---|
| 13,150 | Great Britain | July 10, 1897 |